(12) United States Patent
Inturi et al.

(10) Patent No.: US 11,031,032 B1
(45) Date of Patent: Jun. 8, 2021

(54) CRYOGENIC MAGNETIC ALLOYS WITH LESS GRAIN REFINEMENT DOPANTS

(71) Applicant: Seagate Technology LLC, Cupertino, CA (US)

(72) Inventors: Venkateswara Inturi, Shakopee, MN (US); Joseph Mundenar, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 578 days.

(21) Appl. No.: 15/477,211

(22) Filed: Apr. 3, 2017

(51) Int. Cl.
*G11B 5/39* (2006.01)
*H01F 41/16* (2006.01)
*H01F 1/147* (2006.01)
*G11B 5/31* (2006.01)

(52) U.S. Cl.
CPC ........... *G11B 5/3906* (2013.01); *G11B 5/313* (2013.01); *G11B 5/3169* (2013.01); *H01F 1/14733* (2013.01); *H01F 41/16* (2013.01)

(58) Field of Classification Search
CPC ....... G11B 5/295; G11B 5/313; G11B 5/3146; G11B 5/3169; G11B 5/3906; H01F 41/16; H01F 1/1473
USPC ..... 360/324.2, 328; 427/127, 128, 129, 130, 427/131, 132
See application file for complete search history.

(56) References Cited

U.S. PATENT DOCUMENTS

| | | | |
|---|---|---|---|
| 4,103,315 A | 7/1978 | Hempstead et al. | |
| 5,075,280 A | 12/1991 | Pisharody et al. | |
| 5,584,971 A | 12/1996 | Komino | |
| 7,914,916 B2 | 3/2011 | Inturi et al. | |
| 8,064,161 B2 | 11/2011 | Kudo et al. | |
| 8,582,252 B2 | 11/2013 | Karr et al. | |
| 8,619,394 B1 | 12/2013 | Park et al. | |
| 9,142,226 B2 | 9/2015 | Inturi et al. | |
| 2007/0097560 A1* | 5/2007 | Karr | B82Y 10/00 360/324.2 |
| 2008/0117552 A1* | 5/2008 | Zhou | B82Y 10/00 360/319 |
| 2008/0232001 A1* | 9/2008 | Bonhote | G11B 5/3146 360/319 |
| 2009/0162948 A1 | 6/2009 | Henrichs | |
| 2011/0085265 A1* | 4/2011 | Biskeborn | G11B 5/0083 360/123.12 |
| 2011/0242703 A1* | 10/2011 | Sasaki | G11B 5/6005 360/245.3 |
| 2013/0288078 A1 | 10/2013 | Zhu et al. | |

(Continued)

OTHER PUBLICATIONS

Y. Yoshizawa et al., "Common mode choke cores using the Fe-based alloys composed of ultrafine grain structure", Appl. Phys. 64 (10), Nov. 15, 1998, 0021-8979/88/226047-03$02.40, ©1988 American Institute of Physics, 3 pages.

(Continued)

*Primary Examiner* — Tabassom Tadayyon Eslami
(74) *Attorney, Agent, or Firm* — Westman, Champlin & Koehler, P.A.

(57) ABSTRACT

A method of forming a magnetic element. The method includes cooling a substrate to a cryogenic temperature. The method further includes depositing a magnetic layer with a grain refining dopant on the substrate. The magnetic layer with the grain refining dopant deposited on the substrate cooled to the cryogenic temperature has a magnetic moment that is greater than 2 Tesla and very soft magnetic properties.

10 Claims, 12 Drawing Sheets

(56) References Cited

U.S. PATENT DOCUMENTS

| | | | | |
|---|---|---|---|---|
| 2014/0004387 A1* | 1/2014 | Inturi | ............... | H01F 10/16 |
| | | | | 428/826 |
| 2014/0147702 A1* | 5/2014 | Inturi | ............... | B82Y 25/00 |
| | | | | 428/836.1 |
| 2014/0252518 A1* | 9/2014 | Zhang | ............... | H01L 43/12 |
| | | | | 257/422 |

OTHER PUBLICATIONS

A. Talaat et al., "Grain size refinement in nanocrystalline Hitperm-type glass-coated microwires", Journal of Magnetism and Magnetic Materials 406 (2016) 15-21, http://dx.doi.org/10.1016/j.jmmm.2015.12-034, 0304-8853/©2015 Elsevier B.V., 8 pages.

G. Herzer, "Grain Structure and Magnetism of Nanocrystalline Ferromagnets", IEEE Transactions on Magnetics, vol. 25, No. 5, Sep. 1989, 0018-9464/89/0900-3327$01.00©1989 IEEE, 3 pages.

B. Hernando et al., "Magnetoimpedance effect in Nanoperm alloys", Journal of Magnetism and Magnetic Materials—May 2006, DOI: 10.1016/j.jmmm.2005.10.148, https://www.researchgate.net/publication/225040651, 5 pages.

Kana Takenaka et al., "Production of Nanocrystalline (Fe, Co)-Si-B-P-Cu Alloy with Excellent Soft Magnetic Properties for Commercial Applications", Materials Transactions, vol. 56, No. 3 (2015), pp. 372-376, ©2014 The Japan Institute of Metals and Materials, 5 pages.

\* cited by examiner

CRYOGENIC MAGNETIC ALLOYS WITH LESS GRAIN REFINEMENT DOPANTS

BACKGROUND

Magnetic properties of thin films are of high importance in magnetic data storage. Data storage devices, such as disc drives, use thin-film magnetic recording heads to read and/or write data on magnetic storage media, such as a data storage discs. In a typical disc drive, one or more discs are mounted on a spindle motor, which causes the disc(s) to spin. Thin-film recording heads carried by a slider are used to read from and write to data tracks on the disc(s). The slider is typically carried by a head arm assembly that includes an actuator arm and a suspension assembly. During operation, as the disc spins, the slider glides above the surface of the disc on a small cushion of air, for example, and the actuator arm pivots to movably position the slider with respect to the disc.

As areal recording densities for storage discs increase, technological advances and changes to various components (e.g., thin-film magnetic recording heads) of the disc drives are needed.

SUMMARY

Various embodiments of the disclosure are generally directed to magnetic elements (e.g., thin-film magnetic recording heads) that include at least one magnetic layer with a grain refining dopant.

In one embodiment, a method of forming a magnetic element is provided. The method includes cooling a substrate to a cryogenic temperature. The method further includes depositing a magnetic layer with a grain refining dopant on the substrate. The magnetic layer with the grain refining dopant deposited on the substrate cooled to the cryogenic temperature has a magnetic moment that is greater than 2 Tesla.

This summary is not intended to describe each disclosed embodiment or every implementation of elements with cryogenic magnetic alloys having grain refining dopants. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

In magnetic thin films, it is highly desirable to achieve soft magnetic properties like permalloy films but with as high a magnetic moment value as possible. A primary approach employed to achieve soft magnetic properties involves reducing grain size in the magnetic layer by adding a grain refining agent (e.g., Hf, B, Ta, Zr, etc.) to a magnetic alloy (e.g., a combination of Ni, Co and Fe) that forms the layer. However, it is often required to dope too much of the grain refining agent to realize soft magnetic properties, which results in an undesirable significant reduction in magnetic moment of the magnetic layer.

In embodiments of the disclosure, to dope less grain refining agent but still achieve very soft magnetic properties, the magnetic layer with the grain refining dopant is cryogenically deposited (e.g., deposited on a substrate that is cooled to a cryogenic temperature (for example, to a temperature between about 50 and about 300 degrees Kelvin (K))). Details of such embodiments are provided after a description of an illustrative operating environment, which is provided below.

Figure 1:
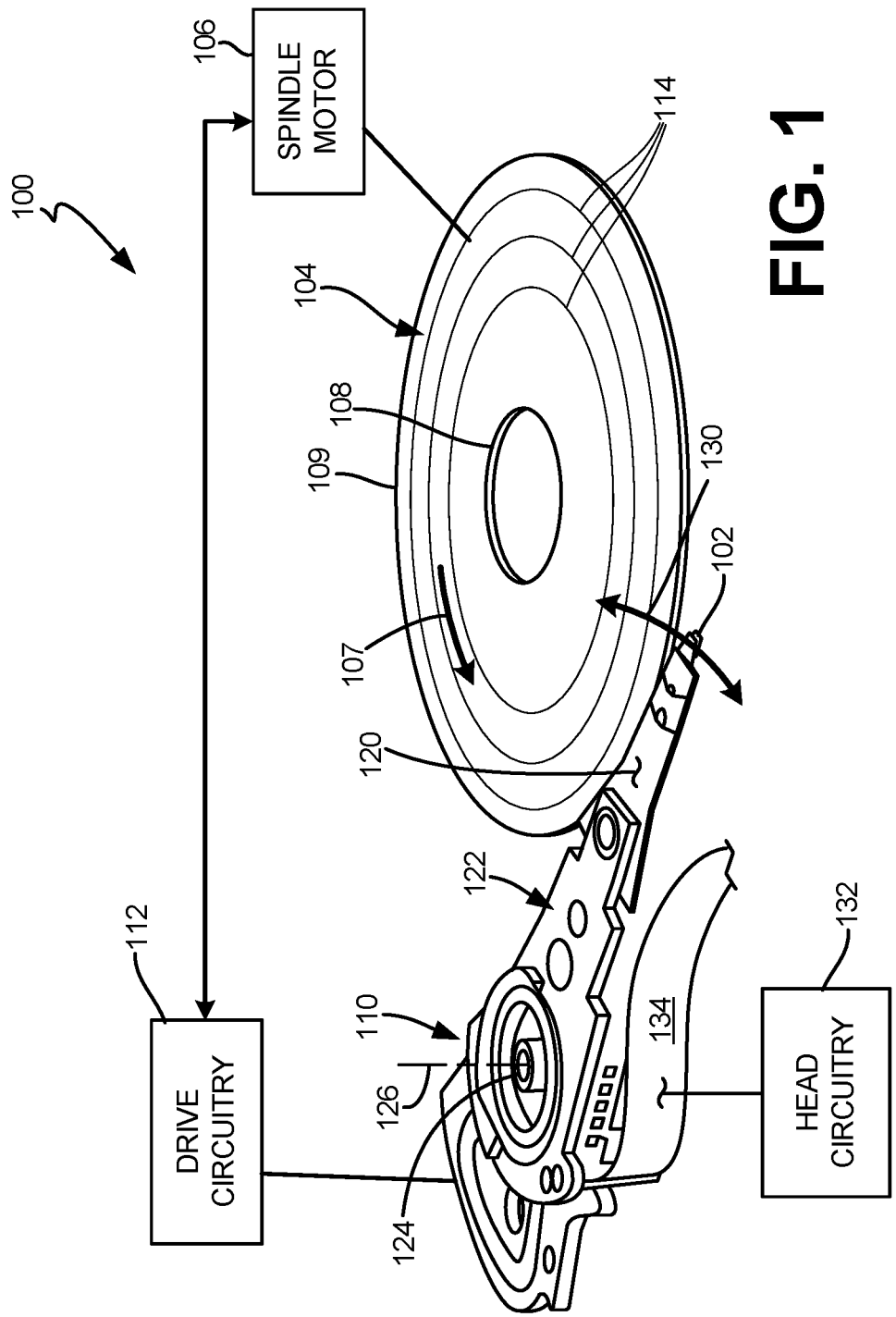
FIG. 1 illustrates an embodiment of a data storage device in which embodiments of the present application can be used.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
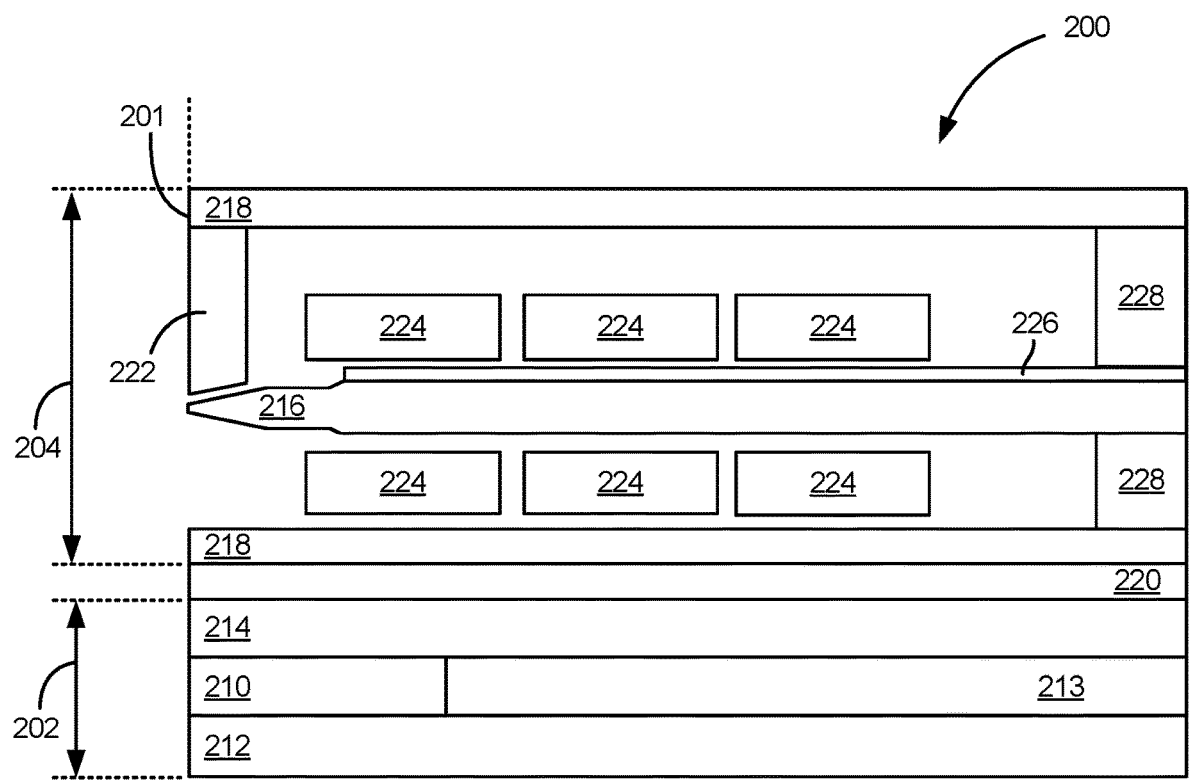
FIG. 2 is a schematic illustration of a recording head including one or more transducer elements.
Figure 2:
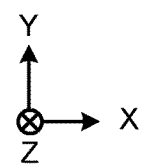

FIG. 2 displays a cross-sectional block representation of an embodiment of a recording head 200 taken along a plane substantially normal to a plane of a bearing surface (for example, an air bearing surface (ABS)) 201 of recording head 200. The recording head elements shown in FIG. 2 are illustratively included in a recording head such as recording head 102 in FIG. 1. Those skilled in the art will recognize that recording heads commonly include other components. Embodiments of the present disclosure are not limited to any particular recording heads. Embodiments of the present disclosure may be practiced in different types of recording heads.

Recording head 200 can have one or more magnetic elements, such as a magnetic reading element 202 and a writing element 204, which can operate individually, or concurrently, to write data to, or retrieve data from, an adjacent storage medium, such as medium 104 of FIG. 1.

The magnetic reading element 202, as shown, has a magnetoresistive (MR) sensor 210 disposed between bottom and top shields 212 and 214. An insulation layer 213 is also included between shields 212 and 214, and is positioned behind MR sensor 210 relative to the bearing surface 201. Reading element 202 may further include side shields (not shown in FIG. 2) positioned proximate to sides of MR sensor 210.

The writing element 204 has a write pole 216 and at least one return pole 218 that creates a writing circuit to impart a desired magnetic orientation to the adjacent storage medium (e.g., storage medium 104 of FIG. 1). While not limiting, some embodiments use the writing element 204 to write data perpendicularly to the adjacent data storage medium. Such perpendicular recording can allow for substantially densely packed data bits.

In another non-limiting embodiment, the writing element 204 can include at least two return poles 218 positioned contactingly adjacent a non-magnetic spacer layer 220 and a bearing surface shield or front shield 222. The writing element 204 may further include a coil 224 that can be one or many individual wires and a yoke 226 that attaches to the write pole 216 and operates with the coil 224 to impart a magnetic flux that travels from the write pole 216 through conductive vias 228 to conclude at the return poles 218. It should be noted that the various aspects of the head 200 can be characterized as either uptrack or downtrack, along a y axis, depending on the motion of the data storage medium (e.g., medium 104 of FIG. 1) with which the head 200 communicates. In FIG. 2, a z-direction is a cross-track direction and an x-direction is a stripe-height direction.

In various embodiments, at least one magnetic layer of recording head 200 includes a grain refining dopant. In the description below, the symbol "R" in chemical formulae refers to grain refining agent. One example of a magnetic layer with a grain refining agent is FeCoR. Another example of a magnetic layer with a grain refining agent is FeCoNiR. As noted above, examples of R include but are not limited to Hf, B, Ta, Zr, C, Al, Ti, Si, rare-earth materials, etc.

During fabrication of recording head 200, at least one magnetic layer with the grain refining agent or dopant is cryogenically deposited (e.g., deposited on a substrate or under-layer that is cooled to a cryogenic temperature (for example, to a temperature between about 50 and about 300 K)). As noted above, such cryogenic deposition of the magnetic layer with the grain refining agent provides the ability to dope less grain refining agent but still achieve very soft magnetic properties. It should be noted that the substrate or under-layer that is cooled to the cryogenic temperature may include multiple structures of partially-fabricated head 200 which are below the magnetic layer with the grain refining dopant.

After the deposition of the magnetic layer with the grain refining dopant on the cryogenically cooled substrate, various stresses (e.g., compressive stresses) may develop in the magnetic layer with the grain refining agent. To mitigate stresses and reduce magnetic dispersion, the magnetic layer with the grain refining agent deposited on the substrate may be annealed at a suitable temperature (e.g., between about 200 degrees Celsius (° C.) and about 300 (° C.) for a suitable time period (e.g., a few hours)). In a specific embodiment, the annealing may be carried out at approximately 225° C. for about 2 hours. After such annealing, the magnetic layer with the grain refining agent has a magnetic moment that is greater than 2 Tesla (T) and has very soft magnetic properties like permalloy.

It should also be noted that not all magnetic layers of the recording head 200 need to include the grain refining agent. Further, not all layers of recording head 200 need to be deposited while the substrate is maintained at a cryogenic temperature. Some layers of recording head 200 may be deposited on a substrate at room temperature (e.g., a temperature range indoors between about 65 and about 85 degrees Fahrenheit (° F.)) or even above room temperature.

Figure 3:
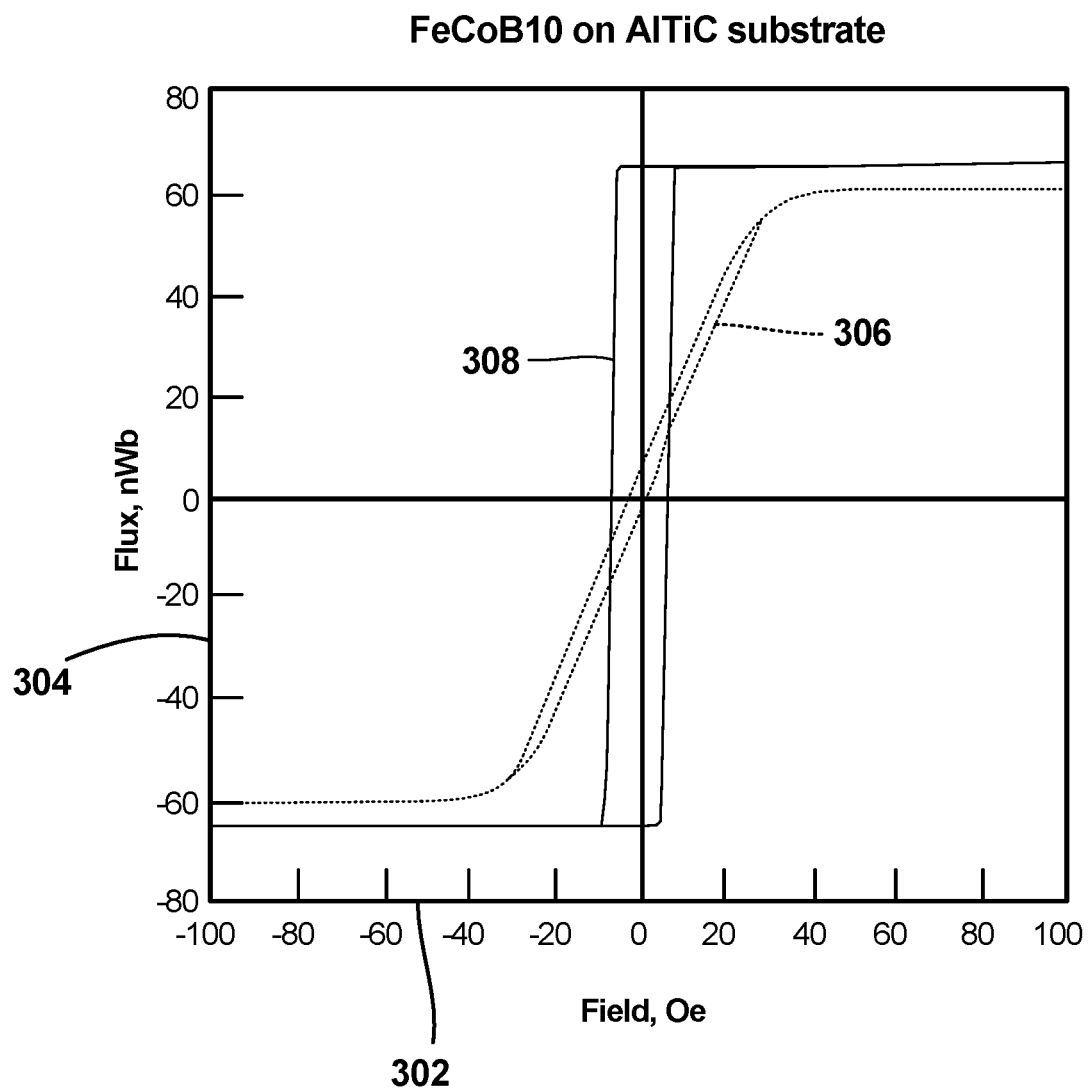
FIG. 3 is a graph showing magnetic characteristics of a magnetic element formed without cooling any portions of the element to a cryogenic temperature.

FIG. 3 plots example magnetic characteristics provided by a FeCoB film deposited on an AlTiC substrate at nominal temperature (e.g., room temperature) and annealed. The layer has a saturation magnetization or magnetic moment of about 2 T. In FIG. 3, horizontal axis 302 represents magnetic field in Oersted (Oe) and vertical axis 304 represents flux in nanowebers (nWb). As can be seen from the hysteresis loops shown in FIG. 3, segmented loop 306 illustrates a hard axis coercivity of about 2.6 Oe while solid loop 308 shows an easy axis coercivity of about 6.1 Oe.

Figure 4A:
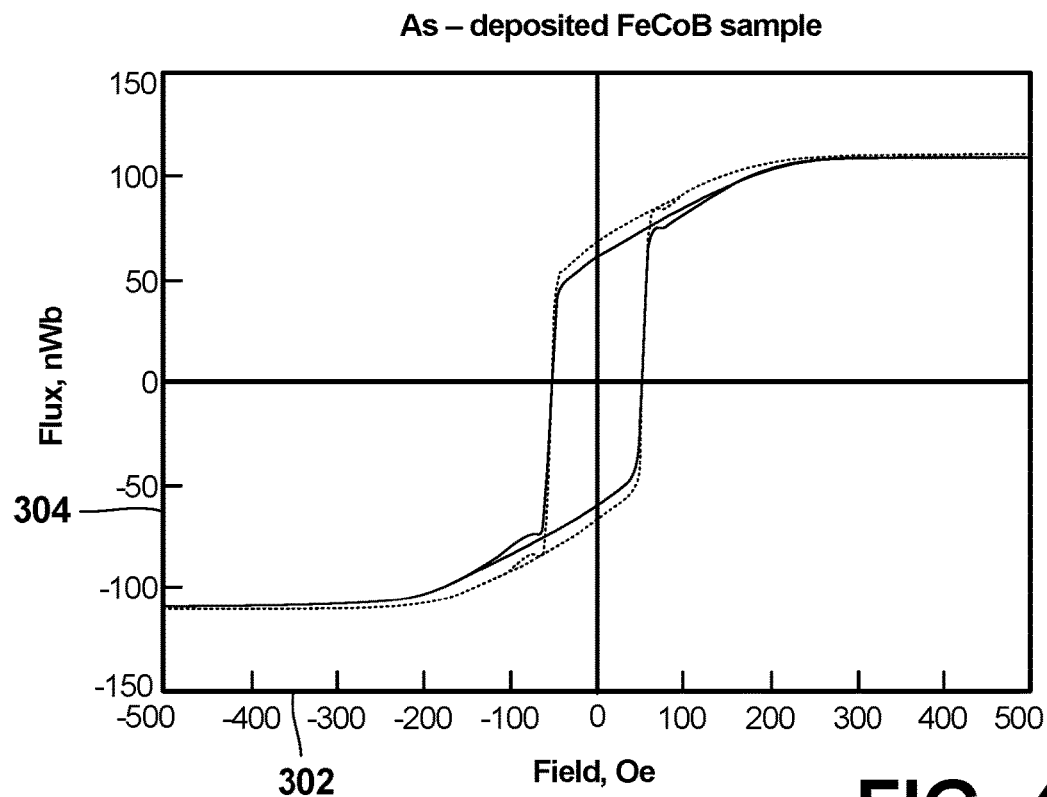
FIGS. 4A and 4B are graphs showing magnetic characteristics of a magnetic element formed by cooling the element to a cryogenic temperature.
Figure 4B:
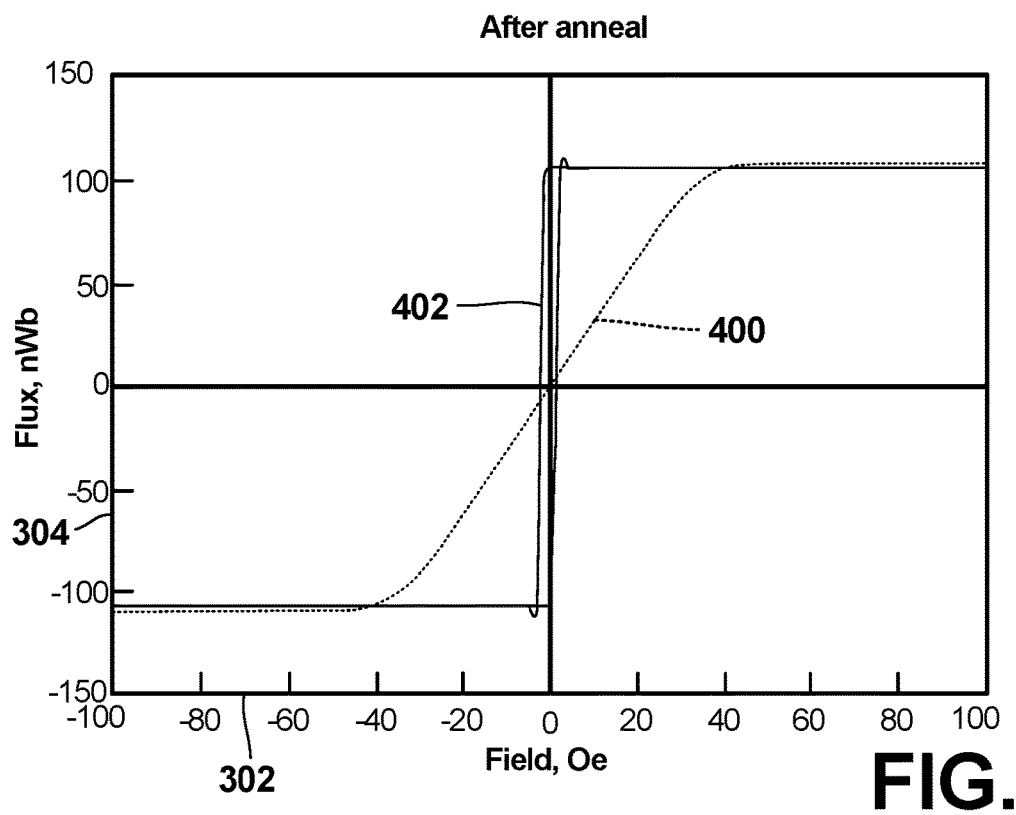

FIGS. 4A and 4B plot magnetic characteristics provided by a FoCoB film obtained with the addition of a cryogenic temperature to the deposition process. FIG. 4A shows hysteresis loops provided by an as-deposited FeCoB film before annealing is carried out. As indicated above, the deposition of the FeCoB layer on the cryogenically cooled substrate may cause compressive stresses, which negatively impact the magnetics of the layer.

FIG. 4B shows hysteresis loops provided by the cryogenically deposited FeCoB layer after annealing. The layer has a saturation magnetization or magnetic moment that is greater 2 T. As can be seen from the hysteresis loops shown in FIG. 4B, segmented loop 400 illustrates a hard axis coercivity that is less than 0.2 Oe while solid loop 402 shows an easy axis coercivity of less than 2 Oe. Thus, a comparison of the plots of FIG. 3 and FIG. 4B shows a substantial improvement in magnetic properties as a result of the inclusion of cryogenic deposition. Accordingly, the hysteresis loops in FIG. 4B, which correspond to the cryogenically deposited magnetic layer with the grain refining agent, support the ability to produce magnetic layers with high permeability and low coercive fields. Details of a magnetic reading element having at least one cryogenically deposited magnetic layer are provided below in connection with FIGS. 5 and 6A-6D. Thereafter, details regarding cryogenic deposition of at least one layer of a magnetic writing element are provided in connection with FIGS. 7A and 7B.

Figure 5:
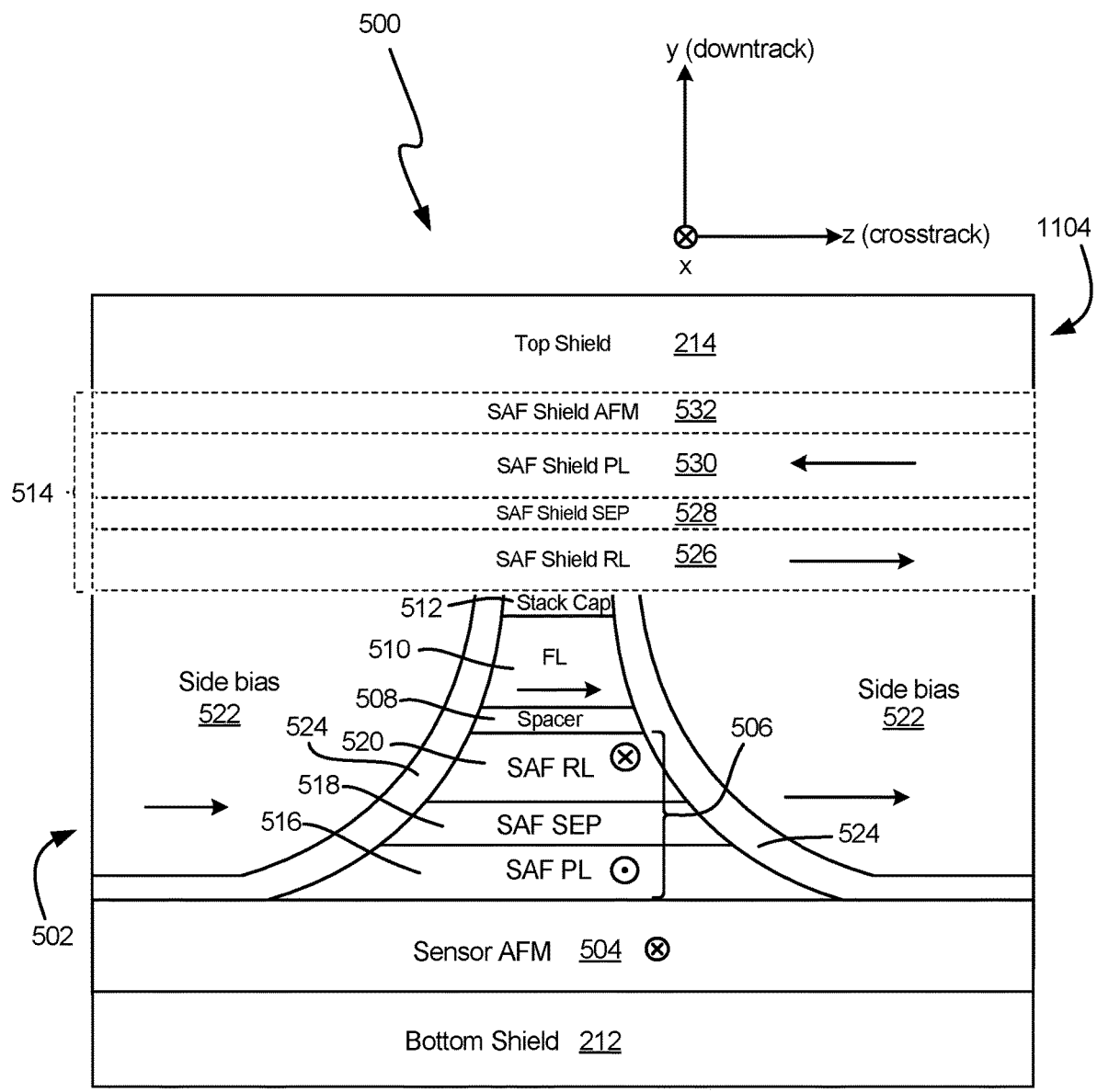
FIG. 5 is a bearing surface view of one embodiment of a magnetoresistive (MR) sensor.

FIG. 5 is a schematic block diagram (bearing surface view) illustrating an example reading element or read head 500 that includes at least one cryogenically deposited magnetic layer. The read head elements shown in FIG. 5 are illustratively included in recording heads such as 102 of FIGS. 1 and 200 of FIG. 2.

In read head 500, a magnetoresistive sensor 502 is positioned between a bottom shield 212 and a top shield 214. Magnetoresistive sensor 502 includes a plurality of layers including a sensor antiferromagnetic (AFM) layer 504, sensor stack synthetic antiferromagnetic (SAF) structure 506, a spacer layer 508, a free layer or sensing layer 510, a stack cap 512 and a SAF shielding structure 514.

In the embodiment shown in FIG. 5, the sensor SAF structure 506 includes a pinned layer 516 a thin separation layer 518, which may comprise a metal such as ruthenium (Ru) in some embodiments, and a reference layer 520. The magnetic moments of each of the pinned layer 516 and the reference layer 520 are not allowed to rotate under magnetic fields in the range of interest (for example, magnetic fields generated by the bits of data stored on the data discs). The magnetic moments of the reference layer 520 and the pinned layer 516 are generally oriented normal to the plane (i.e., the x direction) of FIG. 5 and anti-parallel to each other.

The magnetic moment of the free layer 510 is free to rotate under the influence of an applied magnetic field in a range of interest. The read head 500 further includes side biasing magnets or side shields 522, which produce a magnetic field that biases the free layer 510 with a magnetic moment parallel to the plane of the figure and generally oriented horizontally. This bias prevents the magnetic moment of the free layer 510 from drifting due to, for example, thermal energy, which may introduce noise into the data sensed by the read head 500. The bias is sufficiently small, however, that the magnetic moment of the free layer 510 can change in response to an applied magnetic field, such as a magnetic field of a data bit stored on the data discs. As will be described further below in connection with FIGS. 6A-6D, side biasing magnets or side shields 522 are formed by deposition of a magnetic layer with a grain refining agent on a cryogenically cooled substrate. The magnetoresistive sensor 502 is separated and electrically isolated from the side biasing magnets or side shield 522 by an isolation layer 524 including, for example, insulating materials.

In the embodiment shown in FIG. 5, SAF shielding structure 514 includes a SAF shield reference layer 526, a thin SAF shield separation layer 528, which may comprise a metal such as Ru in some embodiments, a SAF shield pinned layer 530 and a SAF shield AFM layer 532. Additionally, in some embodiments, there may be non-magnetic metal inserts (not shown) between SAF shield AFM 522 and top shield 214, and between sensor AFM 304 and bottom shield 212.

In some embodiments, sensor 502 may utilize tunnel magnetoresistance (TMR) or giant magnetoresistance (GMR) effects. In embodiments that utilize TMR effects, spacer layer 508 is a tunneling barrier layer that separates the SAF structure 506 from the free layer 510. The tunneling barrier layer 508 is sufficiently thin that quantum mechanical electron tunneling occurs between a reference layer 520 in the SAF structure 506 and the free layer 510. The electron tunneling is electron-spin dependent, making the magnetic response of the magnetoresistive sensor 502 a function of the relative orientations and spin polarizations of the SAF structure 506 and the free layer 510. The highest probability of electron tunneling occurs when the magnetic moments of the SAF structure 506 and the free layer 510 are parallel, and the lowest probability of electron tunneling occurs when the magnetic moments of the SAF structure 506 and the free layer 510 are antiparallel. Accordingly, the electrical resistance of the magnetoresistive sensor 502 changes in response to an applied magnetic field. The data bits on the data discs in the disc drive may be magnetized in a direction normal to the plane of FIG. 5, either into the plane of the figure, or out of the plane of the figure. Thus, when the magnetoresistive sensor 502 passes over a data bit, the magnetic moment of the free layer 510 is rotated either into the plane of FIG. 5 or out of the plane of FIG. 5, changing the electrical resistance of the magnetoresistive sensor 502. The value of the bit being sensed by the magnetoresistive sensor 502 (for example, either 1 or 0) may therefore be determined based on the current flowing from a first electrode (not shown) to a second electrode (not shown) connected to the magnetoresistive sensor 502.

As indicated above, in some embodiments, side biasing magnets or side shields 522 are formed by deposition of a magnetic layer with a grain refining agent on a cryogenically cooled substrate. Certain fabrication steps of one such embodiment are very briefly described below in connection with FIGS. 6A-6D.

Figure 6A:
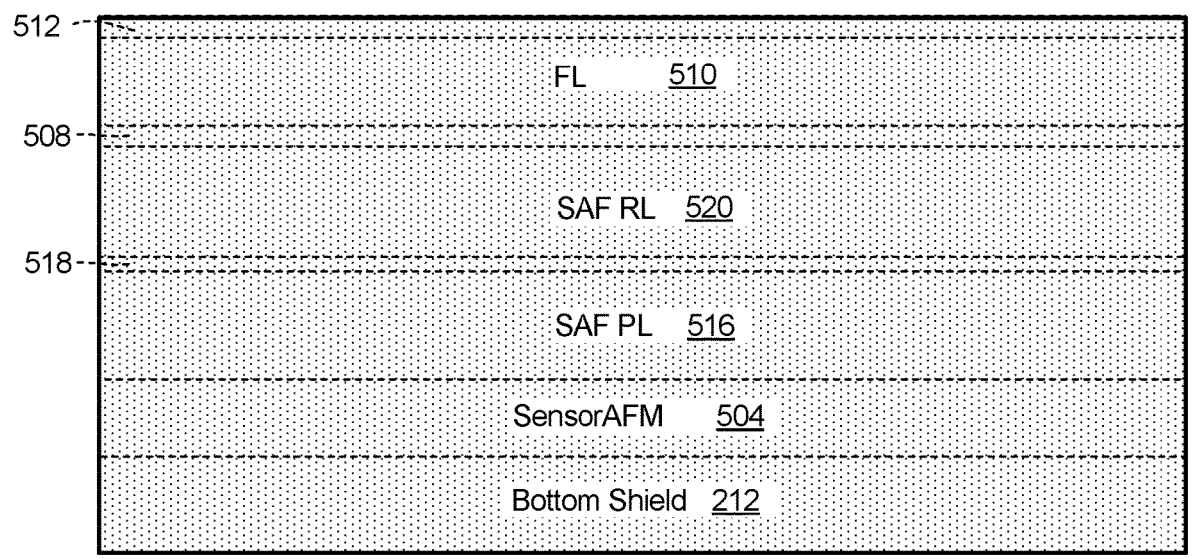
FIGS. 6A-6D together illustrate the formation of a portion of the MR sensor of FIG. 5.
Figure 6B:
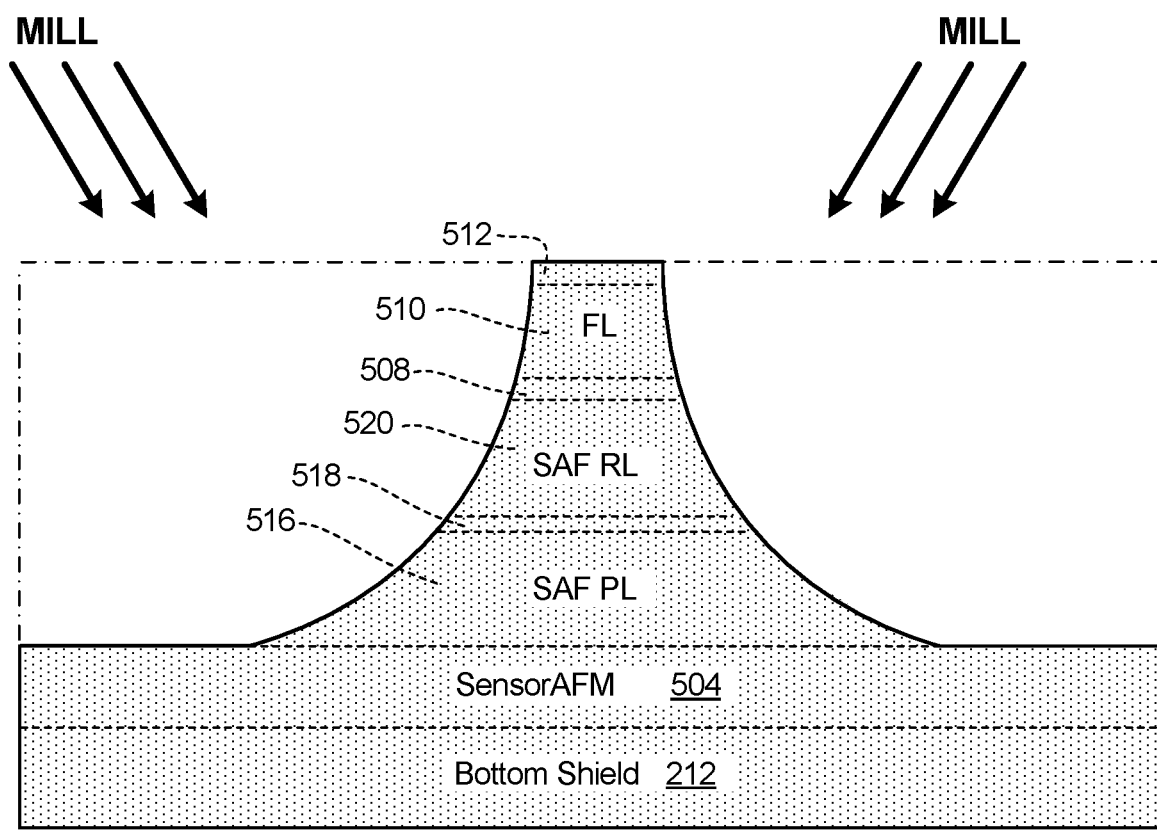
Figure 6C:
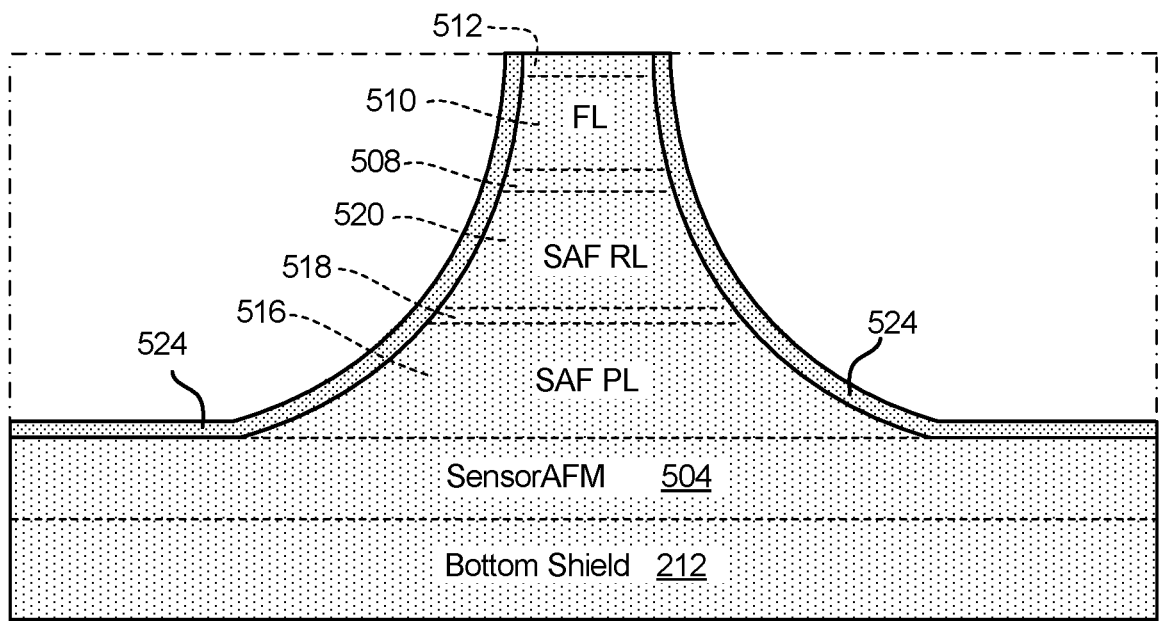
Figure 6D:
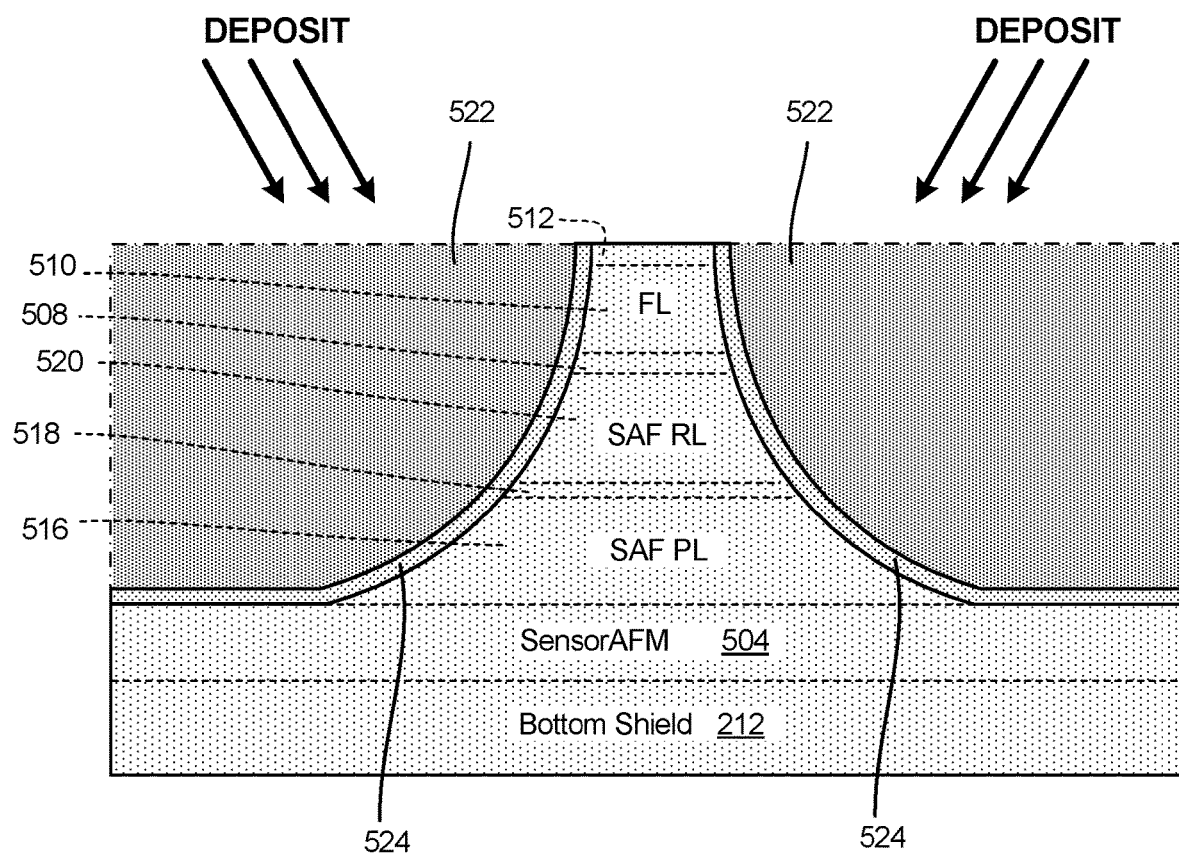

Fabrication of read head 400 in accordance with one embodiment includes depositing the bottom shield 212 and layers 504, 516, 518, 520, 508, 510 and 512 of sensor 502 to form a single stack shown in FIG. 6A. Thereafter, oblique milling may be carried out on the single stack as shown in FIG. 6B. An insulating layer 524 may then be formed using any suitable technique to provide the structure shown in FIG. 6C. The structure shown in FIG. 6C is then cryogenically cooled, and side biasing magnets or sides shields 522 are formed by depositing a magnetic material with a grain refining agent on the cryogenically cooled structure/substrate. The deposition step is shown in FIG. 6D. The structure formed in FIG. 6D may then be annealed to obtain side biasing magnets or side shields 522 with very soft magnetic properties and a relatively high magnetic moment value. SAF shielding structure 514 (shown in FIG. 5) and top shield 214 (shown in FIG. 5) may then be formed to complete the read head structure 500.

Figure 7A:
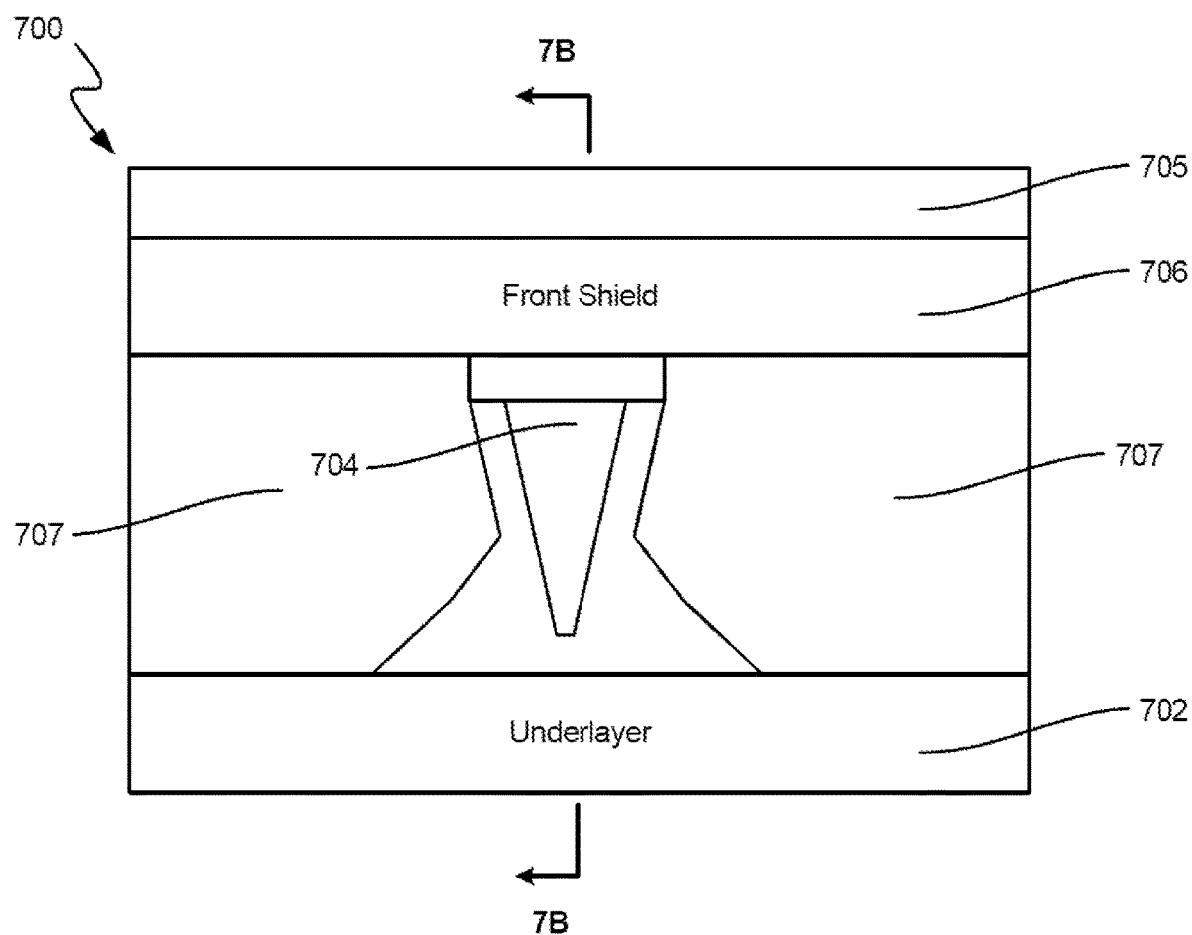
FIGS. 7A and 7B illustrate a portion of a magnetic write head.
Figure 7B:
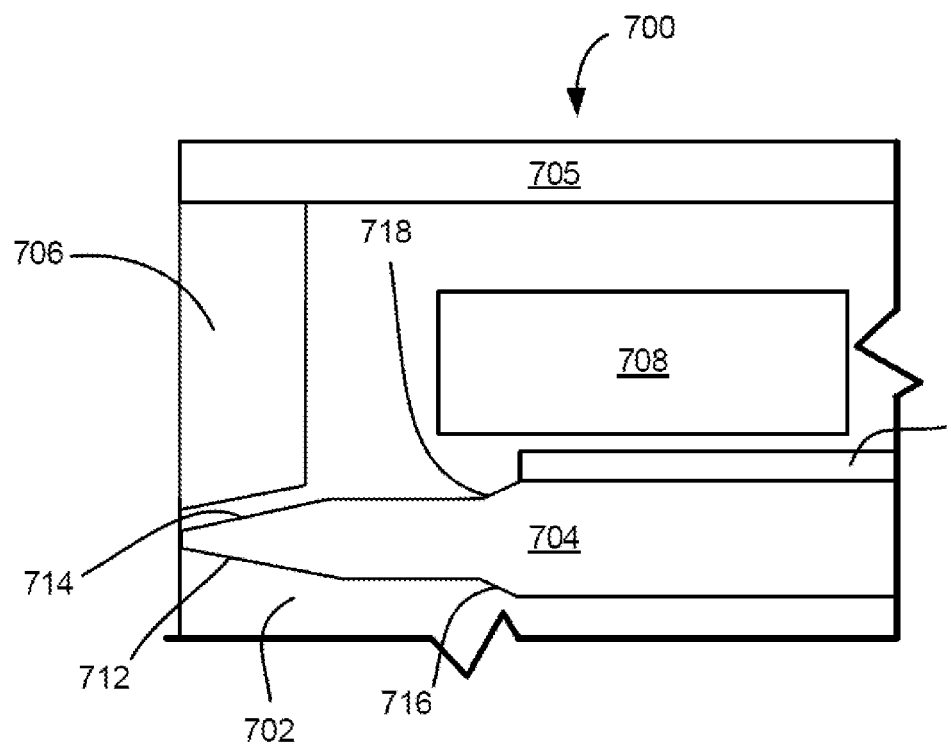

FIGS. 7A and 7B depict air bearing surface and side views of a portion of an example writing element or write head 700 that includes at least one cryogenically deposited magnetic layer. The write head elements shown in FIGS. 7A and 7B are illustratively included in recording heads such as 102 of FIGS. 1 and 200 of FIG. 2.

Figure 7C:
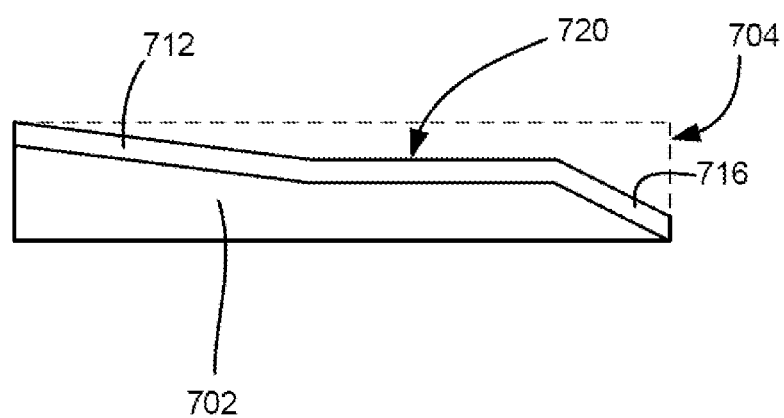
FIG. 7C illustrates a portion of the magnetic write head of FIGS. 7A and 7B formed by cooling to a cryogenic temperature.

Write head 700 includes an under-layer/substrate 702, a main pole 704, at least one return pole 705, a front shield 706, side shields 707, coils 708 and yoke 710. As can be seen in FIG. 7A, write head 700 includes multiple beveled portions 712, 714, 716 and 718. In different embodiments, one or more of beveled portions 712, 714, 716, 718, and yoke 710, return pole 705, front shield 706 and/or side shields 707 (shown in FIG. 7A) may include a cryogenically deposited magnetic layer with a grain refining agent. FIG. 7C illustrates a magnetic layer with a grain refining agent (denoted by reference numeral 720) including beveled portions 712 and 716 deposited on cryogenically cooled substrate 702, and then annealed to a suitable temperature and for a predetermined time period. Additional magnetic layers, which may or may not include grain refining agents, may then be deposited at room temperature or at cryogenic temperatures to form the remaining portion of main pole 704, return pole 705, front shield 706, side shields 707 and yoke 710. It should be noted that, in some embodiments, main pole 704, return pole 705, front shield 706 and side shields 707 may each be laminated structures (e.g., multi-layered structures) that include at least one magnetic layer with a grain refining agent deposited on a cryogenically cooled substrate. Also, one or more layers in the laminated structures may be non-magnetic layers. Further, one or more layers in the laminated structures may be magnetic layers deposited on a substrate at or above room temperature.

Figure 8:
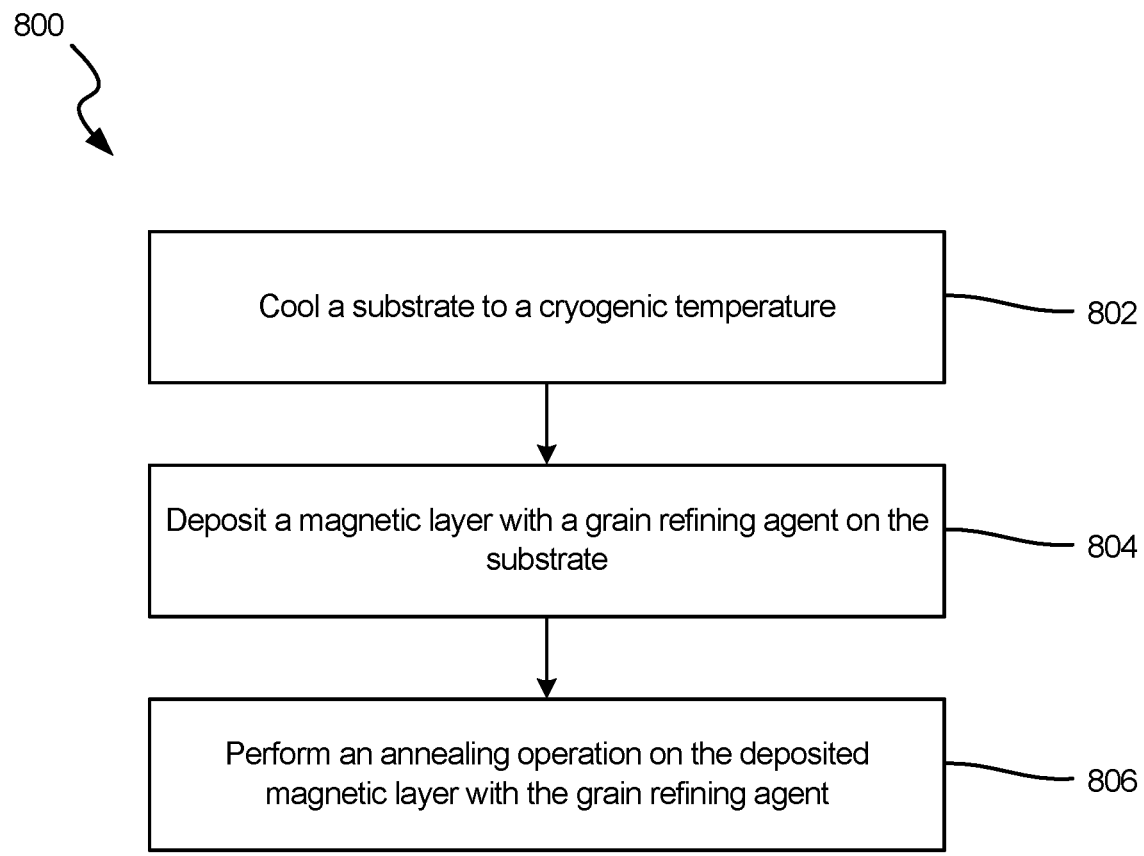
FIG. 8 is a flow diagram of a method embodiment.

FIG. 8 is a simplified flow diagram 800 of a general method embodiment. At step 802, a substrate is cooled to a cryogenic temperature. At step 804, a magnetic layer with a grain refining agent is deposited on the substrate. Then, at step 806, an annealing operation is performed on the deposited magnetic layer with the grain refining agent. The magnetic layer formed by the method of FIG. 8 may have a magnetic moment value that is greater than 2 T, a hard axis coercivity that is less than about 0.2 Oe and an easy axis coercivity less than about 2 Oe.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   cooling a substrate to a cryogenic temperature;
   depositing a magnetic layer having a grain refining agent over the substrate cooled to the cryogenic temperature, the magnetic layer having the grain refining agent being a writing element layer; and
   performing an annealing operation above room temperature on the magnetic layer having the grain refining agent deposited over the substrate cooled to the cryogenic temperature,
   wherein a temperature to which the substrate is cooled and an amount of the grain refining agent utilized are selected to prevent the magnetic layer with the grain refining agent from having a magnetic moment that is less than or equal to 2 Tesla, and
   wherein the magnetic layer with the grain refining agent comprises a hard axis coercivity that is less than about 0.2 Oersted and an easy axis coercivity that is less than about 2 Oersted.

2. The method of claim 1 and further comprising performing the annealing operation on the deposited magnetic layer up to 300 degrees Celsius for a predetermined time period.

3. The method of claim 1 and wherein the magnetic layer comprises Fe and Co.

4. The method of claim 1 and wherein depositing the magnetic layer having the grain refining agent over the substrate comprises depositing a writing element magnetic yoke having the grain refining agent over the substrate cooled to the cryogenic temperature.

5. The method of claim 1 and wherein depositing the magnetic layer having the grain refining agent over the substrate comprises forming writing element magnetic beveled portions having the grain refining agent over the substrate cooled to the cryogenic temperature, the beveled portions being between the substrate and a main write pole.

6. The method of claim 1 and wherein depositing the magnetic layer having the grain refining agent over the substrate comprises depositing one or more writing element magnetic shields having the grain refining agent over the substrate cooled to the cryogenic temperature.

7. The method of claim 1 and wherein depositing the magnetic layer having the grain refining agent over the substrate comprises depositing a writing element return pole having the grain refining agent over the substrate cooled to the cryogenic temperature.

8. The method of claim 1 and wherein depositing the magnetic layer having the grain refining agent over the substrate comprises depositing a writing element main pole having the grain refining agent over the substrate cooled to the cryogenic temperature.

9. The method of claim 1 and wherein the magnetic layer with the grain refining agent comprises FeCoB.

10. The method of claim 9 and further comprising performing the annealing operation on the deposited magnetic layer at about 225 degrees Celsius for a predetermined time period.

\* \* \* \* \*